United States Patent
Theimer et al.

(10) Patent No.: US 11,184,842 B2
(45) Date of Patent: Nov. 23, 2021

(54) CONVEYING NON-ACCESS STRATUM MESSAGES OVER ETHERNET

(71) Applicant: NOKIA TECHNOLOGIES OY, Espoo (FI)

(72) Inventors: Thomas Theimer, Baierbrunn (DE); Devaki Chandramouli, Plano, TX (US); Laurent Thiebaut, Antony (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 7 days.

(21) Appl. No.: 16/622,042

(22) PCT Filed: Jun. 13, 2017

(86) PCT No.: PCT/US2017/037166
§ 371 (c)(1),
(2) Date: Dec. 12, 2019

(87) PCT Pub. No.: WO2018/231197
PCT Pub. Date: Dec. 20, 2018

(65) Prior Publication Data
US 2021/0153111 A1   May 20, 2021

(51) Int. Cl.
*H04W 48/18* (2009.01)
*H04L 12/46* (2006.01)
(Continued)

(52) U.S. Cl.
CPC ......... *H04W 48/18* (2013.01); *H04L 12/4633* (2013.01); *H04L 12/4641* (2013.01); *H04W 48/16* (2013.01); *H04W 88/06* (2013.01)

(58) Field of Classification Search
CPC ..... H04W 48/18; H04W 48/16; H04W 88/06; H04L 12/4641; H04L 12/4633
See application file for complete search history.

(56) References Cited

U.S. PATENT DOCUMENTS

| 2012/0218965 A1 | 8/2012 | Chen |
| 2014/0029513 A1 | 1/2014 | Takahashi et al. |

(Continued)

FOREIGN PATENT DOCUMENTS

| CN | 102550057 B | 6/2015 |
| WO | WO 2017/055267 A1 | 4/2017 |

OTHER PUBLICATIONS

International Search Report and Written Opinion for Application No. PCT/US2017/037166 dated Sep. 13, 2017, 14 pages.
(Continued)

*Primary Examiner* — Diane D Mizrahi
(74) *Attorney, Agent, or Firm* — Alston & Bird LLP

(57) ABSTRACT

User equipment appends a header to a non-access stratum (NAS) message to form an encapsulated NAS message. The header is formed according to a wireline access network protocol. The user equipment transmits the encapsulated NAS message over a wireline connection between the user equipment and an interworking function of a core network. The interworking function receives the encapsulated NAS message over the wired connection and forwards the NAS message to a core network entity selected based on addressing information included in the header. A point-to-point control plane session can be established between the user equipment and the interworking function in response to a session request transmitted by the user equipment. The point-to-point control plane session can be used to convey encapsulated NAS messages, which can be used to request establishment of an NAS session for a user plane connection to the core network.

19 Claims, 9 Drawing Sheets

(51) Int. Cl.
 *H04W 48/16* (2009.01)
 *H04W 88/06* (2009.01)

(56) References Cited

U.S. PATENT DOCUMENTS

2014/0064156 A1\* 3/2014 Paladugu .......... H04W 36/0022
 370/259
2014/0078898 A1\* 3/2014 Anchan ............. H04W 36/0066
 370/230

OTHER PUBLICATIONS

*Updates to Solution 8.7: Support Standalone Non-3GG Access via NG2/NG3*, Motorola Mobility, Lenovo, Broadcom, CMCC, Rogers, SA WG2 Meeting #118, S2-166380, (Nov. 2016) 20 pages.
3GPP TR 33.899 VO.5.0, $3^{rd}$ Generation Partnership Project: Technical Specification Group Services and System Aspects; Study on the Security Aspects of the Next Generation System (Release 14) (Oct. 2016) 244 pages.
3GPP TR 23.799 V14.0.0, $3^{rd}$ Generation Partnership Project: Technical Specification Group Services and System Aspects; Study on architecture for Next Generation System (Release 14) (Dec. 2016) 522 pages.
Office Action for Chinese Application No. 2017800934018 dated Apr. 23, 2021, 13 pages.
Office Action for European Application No. 17732682.4 dated May 27, 2021, 6 pages.
Office Action for Indian Application No. 202047001155 dated Aug. 4, 2021, 5 pages.

\* cited by examiner

| N3IWF TABLE 700 | | | | |
|---|---|---|---|---|
| PDU SESSION 1 | UE TEMP 1 | NASoE 1 | MAC 1 | VLAN 1 |
| PDU SESSION 2 | UE TEMP 2 | NASoE 2 | MAC 2 | VLAN 2 |
| PDU SESSION 3 | UE TEMP 3 | NASoE 3 | MAC 3 | VLAN 3 |
| ... | | | | |
| PDU SESSION N | UE TEMP N | NASoE N | MAC N | VLAN N |

FIG. 7

CONVEYING NON-ACCESS STRATUM MESSAGES OVER ETHERNET

CROSS-REFERENCE TO RELATED APPLICATIONS

The present application is a national phase entry of International Application No. PCT/US2017/037166, filed Jun. 13, 2017, the contents of which are incorporated herein by reference in its entirety.

BACKGROUND

The non-access stratum (NAS) is a protocol layer implemented in wireless communication protocol stacks between user equipment and a core network. NAS is the highest stratum of the control plane between user equipment and a mobility management entity (MME) or an access and mobility management function (AMF) at the radio interface. The NAS layer manages the establishment of communication sessions and maintains continuous communication as the user equipment moves through the network. Examples of functions supported by the NAS protocols include mobility of the user equipment and session management procedures that are used to establish and maintain connectivity between the user equipment and a packet data network via the mobile data network. In contrast, an access stratum (AS) layer and corresponding AS protocol are used to convey information over an air interface in the wireless portion of the network. The NAS protocol is transported using radio resource control (RRC) messages in Second Generation (2G), Third Generation (3G), Fourth Generation (4G), and Fifth Generation (5G) networks that operate according to the standards defined by the Third Generation Partnership Project (3GPP).

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 7 is a block diagram of an interworking function (N3IWF) table that stores a mapping between PDU session identifiers and user plane addressing information according to some embodiments.

DETAILED DESCRIPTION

Figure 1:
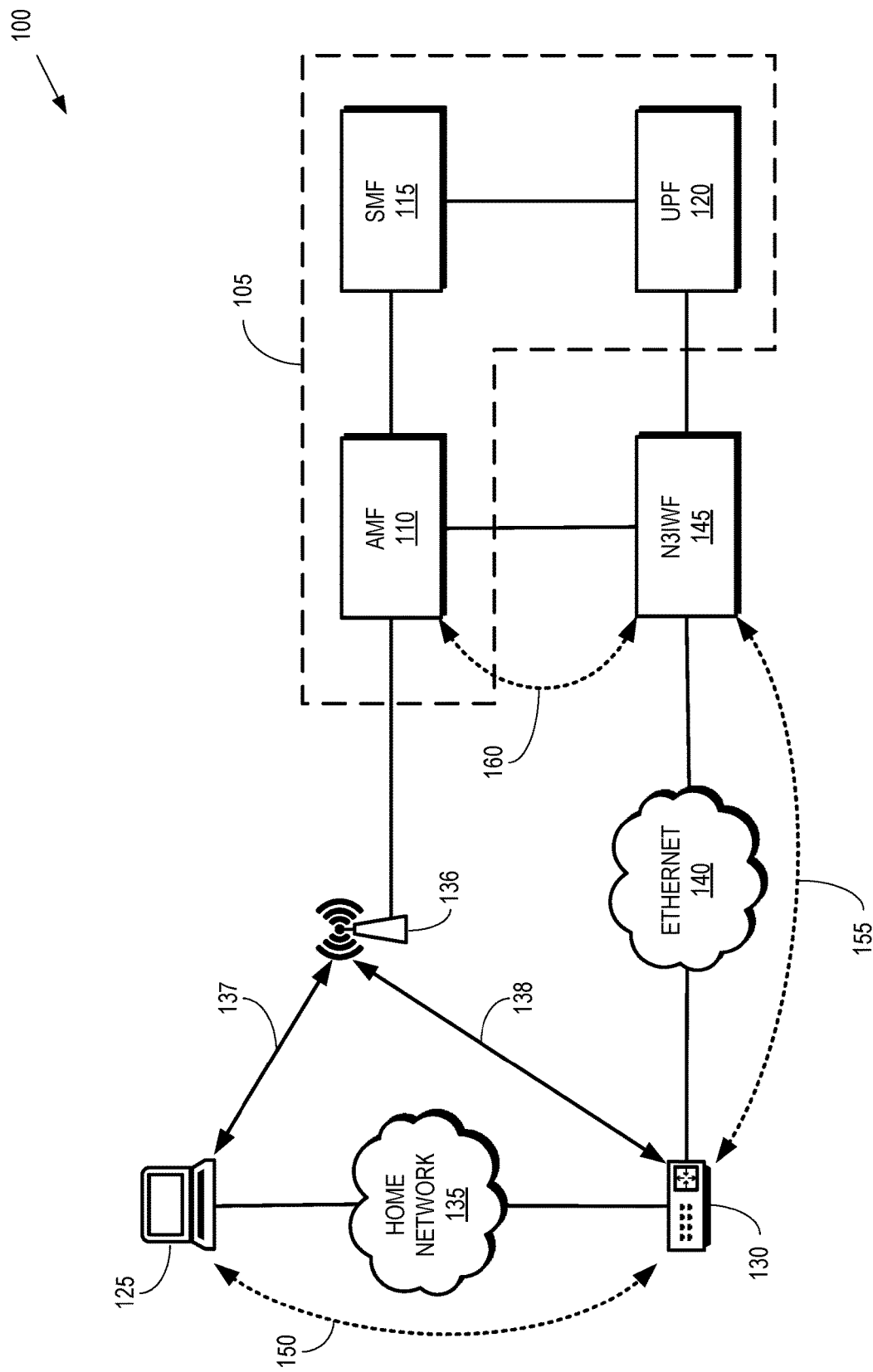
FIG. 1 is a block diagram of a first example of a communication system that supports mobile access and fixed access according to some embodiments.

Upcoming generations of wireless communication systems, such as Fifth Generation (5G) communication systems, are expected to enable applications such as virtual reality, augmented reality, reliable remote operation of machines, factory automation, network-assisted control of traffic and self-driving vehicles, and the cellular "Internet of Things (IoT)" that supports internetworking of physical devices such as appliances, vehicles, buildings, and other items that are embedded with electronics, software, sensors, actuators, and network connectivity that enable the devices to collect and exchange data over the Internet. Future 5G communication systems will therefore be required to support gigabit per second data rates (e.g., to support virtual or augmented reality applications), end-to-end latencies of at most 10 milliseconds (ms) (e.g., to support factory automation applications), reliabilities of at least 99.999% (e.g., for automotive traffic control applications such as platooning), and user equipment densities of tens of millions of devices per square kilometer (e.g., to support cellular IoT applications).

Communication systems that operate according to the 5G standards are expected to provide wireless access and fixed (or wired) access on an equal footing, which is referred to herein as fixed-mobile convergence. User equipment will therefore be able to perform hybrid access by connecting to the 5G communication system via concurrent fixed and wireless connections. An interworking function is used to attach fixed access networks to a 5G core network that also supports wireless access. One purpose of the interworking function is to make the fixed access network appear to be similar to a wireless access network from the perspective of the 5G core network. The interworking function also includes interfaces to functions implemented in the 5G core network. For example, the interworking function (also called N3IWF) supports an N2 interface between the interworking function and an Access and Mobility Management Function (AMF). The interworking function also supports an N3 interface between the interworking function and a User Plane Function (UPF).

Conventional fixed access networks are based on Ethernet connectivity and do not support the radio resource control (RRC) protocol while mobile networks use RRC to carry signaling such as NAS signaling between the user equipment and the core network. Consequently, conventional fixed access networks do not provide a mechanism for transporting NAS messages from user equipment to the interworking function.

User equipment and an interworking function for a 5G core network can exchange NAS messages by implementing an additional protocol layer to encapsulate NAS messages for transmission over a fixed access network, e.g., according to an Ethernet-based L2 protocol that includes wired and wireless local area network (LAN) technologies. The additional protocol layer can be referred to as a NAS over Ethernet (NASoE) layer. Encapsulating an NAS message includes appending a header to the NAS message. The header includes control plane information that can have a number of different uses including: a) identifying entities in the 5G core network such as an AMF or an SMF, b) allowing the interworking function to signal information to control usage of the Ethernet by the user equipment on the interface between the user equipment and the interworking function or c) configuring the interworking function or core network functions to perform their respective tasks. Examples of control plane information elements include a temporary identifier of the user equipment, network slice selection assistance information (NSSAI), and the like. Control plane information can also be used to associate user equipment sessions with corresponding address information on the interface between the user equipment and the interworking function. The encapsulated NAS messages are transmitted using a session (e.g., an NASoE session) established between the additional protocol layers implemented in the user equipment and the interworking function. In order to establish the NASoE session, the user equipment can discover the interworking function by broadcasting discovery packets that are received and acknowledged by the interworking function. The user equipment and the interworking function can then establish a point-to-point control plane session (e.g., the NASoE session) between the two entities, which are identified by their media access control (MAC) addresses and (in some cases) a virtual local area network (VLAN) identifier that identifies the point-to-point control plane session. The user equipment then forwards the encapsulated NAS message using the point-to-point control plane session.

The interworking function forwards the NAS message to the 5G core network based on the control plane information elements included in the header of the encapsulated NAS message. For example, the interworking function can identify an AMF set and an AMF pointer for an AMF that previously served the user equipment. The interworking function can then forward the NAS message to the identified AMF. If the AMF pointer is not present in the header, the interworking function can select a new AMF from the AMF group and forward the NAS message to the selected AMF. Some embodiments of the header include other information such as a session identifier for the session established according to the additional protocol (e.g., the NASoE session) or parameters that indicate a location of the user equipment (e.g. a circuit identifier). The location information may be added by any entity in the signaling path between the user equipment and the interworking function. For example, the location information can be used to indicate a physical line connecting the user equipment to the network. The interworking function also provides support to PDU session management functions. For example, when the SMF (or any other entity responsible for establishing, maintaining, or releasing data connectivity for the user equipment) establishes a PDU session for the user equipment, the SMF creates a corresponding data path between the user equipment and a UPF in the core network. The SMF can therefore send (possibly via the AMF) relevant signaling to the interworking function to indicate the identity of the PDU session that is being established. The interworking function associates the PDU session identifier with user plane addressing information for the user equipment, such as an MAC address or a VLAN identifier, and forwards information indicating the association to the user equipment via the NASoE session.

FIG. 1 is a block diagram of a first example of a communication system 100 that supports mobile access and fixed access according to some embodiments. As used herein, the term "mobile access" refers to accessing the communication system 100 over an air interface. Mobile access can therefore be referred to as wireless access, mobile communication, wireless communication, or other similar terms. The term "fixed access" refers to accessing to the communication system 100 using a device that is physically connected to the communication system 100, e.g., by wires, optical fibers, and the like. Fixed access can therefore be referred to as wireline access, wired communication, or other similar terms. The communication system 100 supports hybrid access that allows devices to concurrently access the communication system 100 using mobile access and fixed access.

The communication system 100 includes a core network 105 that is accessible by either mobile or fixed devices using a common user plane access and a control plane that supports common authentication, authorization, and accounting (AAA) and policy control. The core network 105 includes an access and mobility management function (AMF) 110 that manages access control and mobility for devices in the communication system 100. The core network 105 also includes a session management function (SMF) 115 to set up and manage sessions in the communication system 100 according to network policies. An association between user equipment and the core network 105 can be represented as a PDU session that can be managed by the SMF 115. The PDU session supports data connectivity between user equipment and a data network. The core network 105 further includes one or more user plane functions (UPF) 120 that can be deployed in the communication system 100 to provide services to users of the communication system 100. Some embodiments of the core network 105 include other functionality such as a policy control function, unified data management, and a network function repository function, which are not shown in FIG. 1 in the interest of clarity. Some embodiments of the core network 105 are implemented using network function virtualization and software defined networking, as discussed herein. For example, different network slices can be used to instantiate different instances of the AMF 110, the SMF 115, or the UPF 120 for different users or devices. Each PDU session is part of one network slice.

In the illustrated embodiment, a device 125 has a wired connection to a residential gateway 130 via a home network 135. The term "user equipment" can be used to refer to either the device 125 or the residential gateway 130 (or a combination thereof) because both the device 125 and the residential gateway 130 are owned or operated by the customer on the customer premises. The residential gateway 130 has a wired connection to an Ethernet network 140. Some embodiments of the wired connection use line termination devices such as a digital subscriber line access multiplexer (DSLAM) or a gigabit passive optical network (GPON). The communication system 100 can therefore provide the user equipment (e.g., the device 125 or the residential gateway 130) with fixed access to the core network 105.

The communication system 100 can also provide the user equipment with mobile access to the core network 105, e.g., via a radio access network 136 that is connected to the AMF 110 over a corresponding interface such as an N2 interface. The radio access network 136 is also connected to the UPF 120 by a corresponding interface such as an N3 interface, which is not shown in FIG. 1 in the interest of clarity. The radio access network 136 is able to provide wireless connectivity to the device 125 via a wireless connection 137. The radio access network 136 is also able to provide wireless connectivity to the residential gateway 130 via a wireless connection 138.

The residential gateway 130 can be implemented as a level 2 (L2) or level 3 (L3) gateway. An L2 residential gateway 130 operates as a bridge that transparently forwards Ethernet frames between the home network 135 and Ethernet 140. Internet Protocol (IP) addresses of the device 125 are visible on a wide area network (WAN) interface to the L2 residential gateway 130. Functions such as L3 routing and network address translation (NAT) for the L2 residential gateway 130 are implemented in an operator network, e.g., using virtual functions implemented in the cloud. An L3 residential gateway 130 implements NAT and routing of messages between the home network 135 and the Ethernet 140. Some embodiments of the L3 residential gateway 130 are implemented as an IP router followed by a NAT function that hides the L2 and L3 addresses of the device 125 (and other devices) in the home network 135. In some embodiments, proxy functions are used to extend protocols that rely on L2 across the L3 residential gateway 130.

An interworking function 145 is disposed between the Ethernet 140 and the core network 105. The interworking function 145 can also be referred to as a non-3GPP interworking function (N3IWF). The interworking function 145 is configured to modify or translate messages conveyed from the fixed access user equipment to the core network 105 so that the fixed access user equipment appears to be accessing the core network 105 according to mobile access standards or protocols from the perspective of the core network 105. The interworking function 145 is also configured to modify or translate messages conveyed from the core network 105 to the fixed access user equipment so that the messages received by the fixed access user equipment conform to corresponding fixed access standards or protocols. The interworking function 145 supports interfaces with the AMF 110 and the UPF 120.

The interworking function 145 can be used with devices that support non-access stratum (NAS) and devices that do not support NAS. If the device 125 does not support NAS, the residential gateway 130 allocates an IP address to the device 125, e.g., using NAT or IPv6 prefix delegation. The device 125 is therefore not visible to the core network 105. The residential gateway 130 can relay (in the user plane) dynamic host configuration protocol (DHCP) or router solicitations received from the device 125. Devices that do not support NAS do not require a protocol for transmitting NAS messages via the Ethernet 140. The device 125 shown in FIG. 1 is therefore assumed to support NAS.

The device 125 is configured to communicate with the core network 105 using NAS messages that are conveyed to the residential gateway 130 over the wired connection supported by the home network 135, as indicated by the double headed arrow 150. Some embodiments of the device 125 can have a 5G wireless access connection so that the device 125 is a multi-access device with two parallel 5G connections. If the residential gateway 130 is implemented as an L2 gateway that transparently forwards Ethernet frames, the device 125 appends a header to an NAS message to form an encapsulated NAS message. The header is formed according to the Ethernet protocol so that the encapsulated NAS message can be forwarded by the L2 residential gateway 130. The encapsulated NAS message is forwarded to the interworking function 145 via the Ethernet 140, as indicated by the double headed arrow 155. The interworking function 145 can then strip the header from the encapsulated NAS message and route the original NAS message to the AMF 110 based on addressing information included in the header, as indicated by the double headed arrow 160.

If the residential gateway 130 is implemented as an L3 residential gateway that routes on an IP layer and performs address translation, the device 125 also encapsulates NAS messages in the same way as described above. In that case, the L3 residential gateway 130 acts as an NASoE server that supports NASoE discovery within a home network. The L3 residential gateway 130 receives the encapsulated NAS message transmitted by the device 125 and then the L3 residential gateway 130 relays the encapsulated NAS message to the interworking function 145 using a new NASoE session as indicated by the double headed arrow 155.

Encapsulated NAS messages are conveyed using a point-to-point control plane session that is negotiated between the user equipment and the interworking function 145. One end of the point-to-point control plane session is terminated by the interworking function 145. As discussed herein, the user equipment that terminates the other end of the point-to-point control plane session can be either the device 125 or the residential gateway 130, depending on the configuration of the residential gateway 130. The point-to-point control plane session can be implemented using the Ethernet protocol to carry encapsulated NAS messages, in which case the point-to-point control plane session can be referred to as an NAS over Ethernet (NASoE) session.

Prior to establishing an NAS session, the user equipment registers with the AMF 110 by transmitting an encapsulated NAS registration message via the NASoE session. The encapsulated NAS registration message can include information that is used to perform authorization (and, in some cases, authentication) of the user equipment. Once registered, the user equipment can transmit other messages via the NASoE session to establish data connectivity, e.g., a PDU session between the user equipment and a data network. Some embodiments of the user equipment transmit an encapsulated NAS message over the fixed connection to the interworking function 145 using the point-to-point NASoE control plane session. The encapsulated NAS message includes an NAS message requesting establishment of an NAS session for a user plane connection to the core network 105. The interworking function 145 forwards the session establishment request to the AMF 110, which generates a session identifier for the requested NAS session. The session identifier is returned to the interworking function 145, which determines user plane addressing information for the user equipment. The interworking function 145 relays the NAS message confirming establishment of the requested NAS session and appends a header that includes the identifier and the user plane addressing information to form an encapsulated NAS message, which is then forwarded to the user equipment to complete establishment of the requested NAS session.

Figure 2:
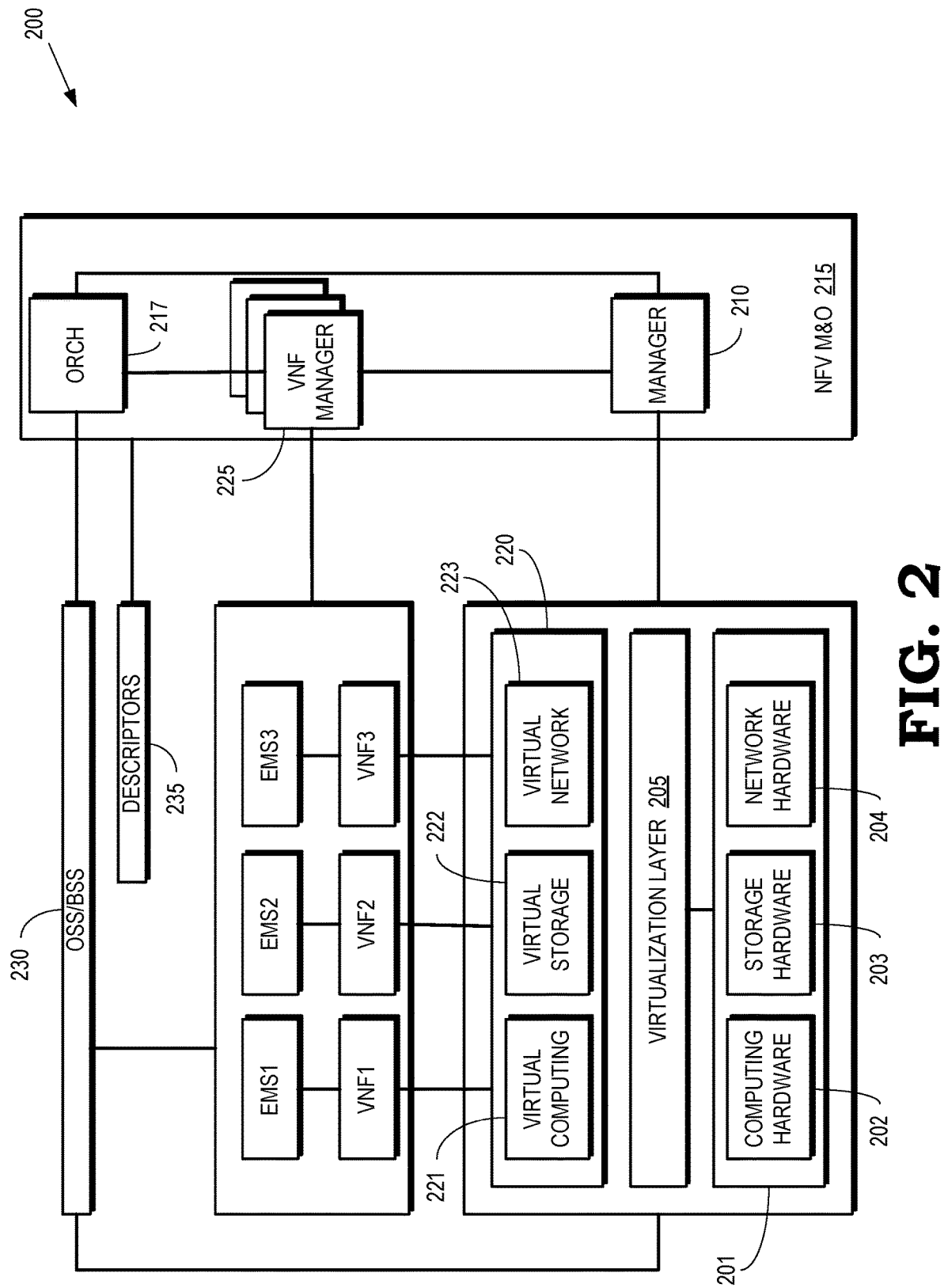
FIG. 2 is a block diagram of a network function virtualization (NFV) architecture according to some embodiments.

FIG. 2 is a block diagram of an NFV architecture 200 according to some embodiments. The NFV architecture 200 may be implemented in some embodiments of the communication system 100 shown in FIG. 1. The NFV architecture 200 includes hardware resources 201 including computing hardware 202, storage hardware 203, and network hardware 204. A virtualization layer 205 provides an abstract representation of the hardware resources 201. The abstract representation supported by the virtualization layer 205 can be managed using a virtualized infrastructure manager 210, which is part of the NFV management and orchestration (M&O) module 215. Some embodiments of the manager 210 are configured to collect and forward performance measurements and events that may occur in the NFV architecture 200. For example, performance measurements may be forwarded to an orchestrator (ORCH) 217 implemented in the NFV M&O 215. The hardware resources 201 and the virtualization layer 205 may be used to implement virtual resources 220 including virtual computing 221, virtual storage 222, and virtual networking 223.

Virtual networking functions (VNF1, VNF2, VNF3) run over the NFV infrastructure (e.g., the hardware resources 201) and utilize the virtual resources 220. For example the virtual networking functions (VNF1, VNF2, VNF3) may be implemented using virtual machines supported by the virtual computing resources 221, virtual memory supported by the virtual storage resources 222, or virtual networks supported by the virtual network resources 223. Element management systems (EMS1, EMS2, EMS3) are responsible for managing the virtual networking functions (VNF1, VNF2, VNF3). For example, the element management systems (EMS1, EMS2, EMS3) may be responsible for fault and performance management. In some embodiments, each of the virtual networking functions (VNF1, VNF2, VNF3) is controlled by a corresponding VNF manager 225 that exchanges information and coordinates actions with the manager 210 or the orchestrator 217.

The NFV architecture 200 may include an operation support system (OSS)/business support system (BSS) 230. The OSS/BSS 230 deals with network management including fault management using the OSS functionality. The OSS/BSS 230 also deals with customer and product management using the BSS functionality. Some embodiments of the NFV architecture 200 use a set of descriptors 235 for storing descriptions of services, virtual network functions, or infrastructure supported by the NFV architecture 200. Information in the descriptors 235 may be updated or modified by the NFV M&O 215.

The NFV architecture 200 can be used to implement network slices that provide control plane functions, such as instances of the AMF 110, the SMF 115, or the UPF 120 shown in FIG. 1. A network slice is a complete logical network that provides communication services and network capabilities, which can vary from slice to slice. User equipment can concurrently access multiple slices. Some embodiments of user equipment provide Network Slice Selection Assistance Information (NSSAI) parameters to the network to assist in selection of a slice instance for the user equipment. A single NSSAI may lead to the selection of several slices. The NFV architecture 200 can also use device capabilities, subscription information and local operator policies to do the selection. An NSSAI is a collection of smaller components, Single-NSSAIs (S-NSSAI), which each include a Slice Service Type (SST) and possibly a Slice Differentiator (SD). Slice service type refers to an expected network behavior in terms of features and services (e.g., specialized for broadband or massive IoT), while the slice differentiator can help selecting among several network slice instances of the same type, e.g. to isolate traffic related to different services into different slices.

Figure 3:
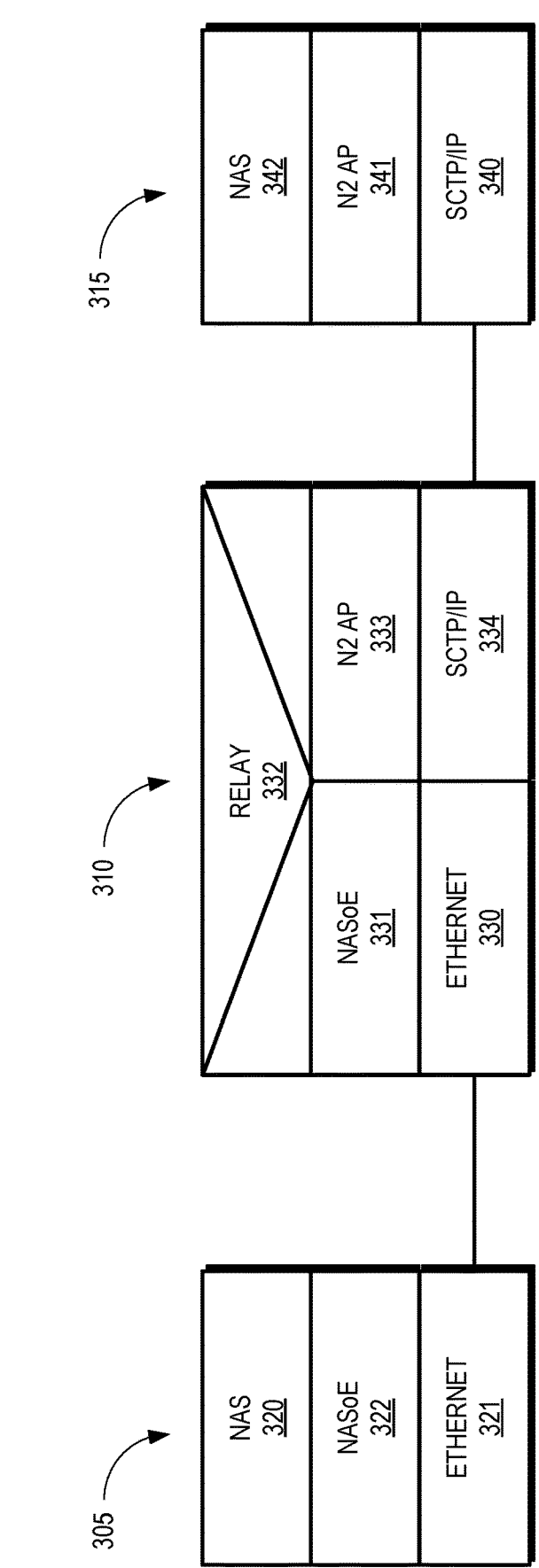
FIG. 3 is a block diagram of a set of protocol stacks that are used to implement encapsulation of NAS messages for transmission over Ethernet according to some embodiments.

FIG. 3 is a block diagram of a set 300 of protocol stacks that are used to implement encapsulation of NAS messages for transmission over Ethernet according to some embodiments. The set 300 includes a protocol stack 305 that is implemented in user equipment such as the device 125 or the residential gateway 130 shown in FIG. 1, a protocol stack 310 that is implemented in an interworking function such as the interworking function 145 shown in FIG. 1, and a protocol stack 315 that is implemented in an AMF such as the AMF 110 shown in FIG. 1.

The protocol stack 305 includes an NAS layer 320 to support communication according to the NAS protocol and an Ethernet layer 321 to support communication according to Ethernet protocols. An NASoE layer 322 is implemented between the NAS layer 320 and the Ethernet layer 321 to support encapsulation of the NAS protocol supported by the NAS layer 320 for transmission of encapsulated NAS messages according to the Ethernet protocol supported by the Ethernet layer 321. For example, the NASoE layer 322 is used to generate and append headers to NAS messages received from the NAS layer 320 to create the encapsulated NAS messages that are provided to the Ethernet layer 321 for transmission. The protocol implemented by the NASoE layer 320 can be referred to as the NASoE protocol. The NASoE layer 322 also supports control plane capabilities that are used to implement NASoE sessions. For example, the NASoE layer 322 supports discovery of interworking functions using discovery messages such as broadcasting discovery packets toward a possible set of candidate interworking functions and receiving acknowledgment packets from one or more of the candidate interworking functions in response to the broadcast discovery packets. The NASoE layer 322 can then select an acknowledgment from one of the candidate interworking functions to identify the interworking function that is utilized for a subsequently established NASoE session. For another example, the NASoE layer 322 supports creation of the NASoE sessions. The NAS layer 320 supports registration/authentication of user equipment with the AMF.

The protocol stack 310 includes an Ethernet layer 330 and an NASoE layer 331 to support encapsulation of the NAS protocol for communication with the protocol stack 305. A relay 332 is used to relay un-encapsulated NAS messages between the NASoE layer 331 and an N2 application protocol (AP) layer 333. The N2 AP layer 333 supports a logical per-user equipment association between the interworking function and the AMF. In some embodiments, a stream control transmission protocol (SCTP) is used as the transport protocol for transmitting messages over N2 AP. An SCTP/IP layer 334 can therefore be used to support an interface with the AMF. The protocol stack 315 also includes an SCTP/IP layer 340, an N2 AP layer 341, and an NAS layer 342. The SCTP/IP layer 334 provides reliable message delivery of N2 AP messages over the N2 interface. Some embodiments of the SCTP/IP layer 334 are based on the SCTP protocol defined in IETF RFC 4960.

Figure 4:
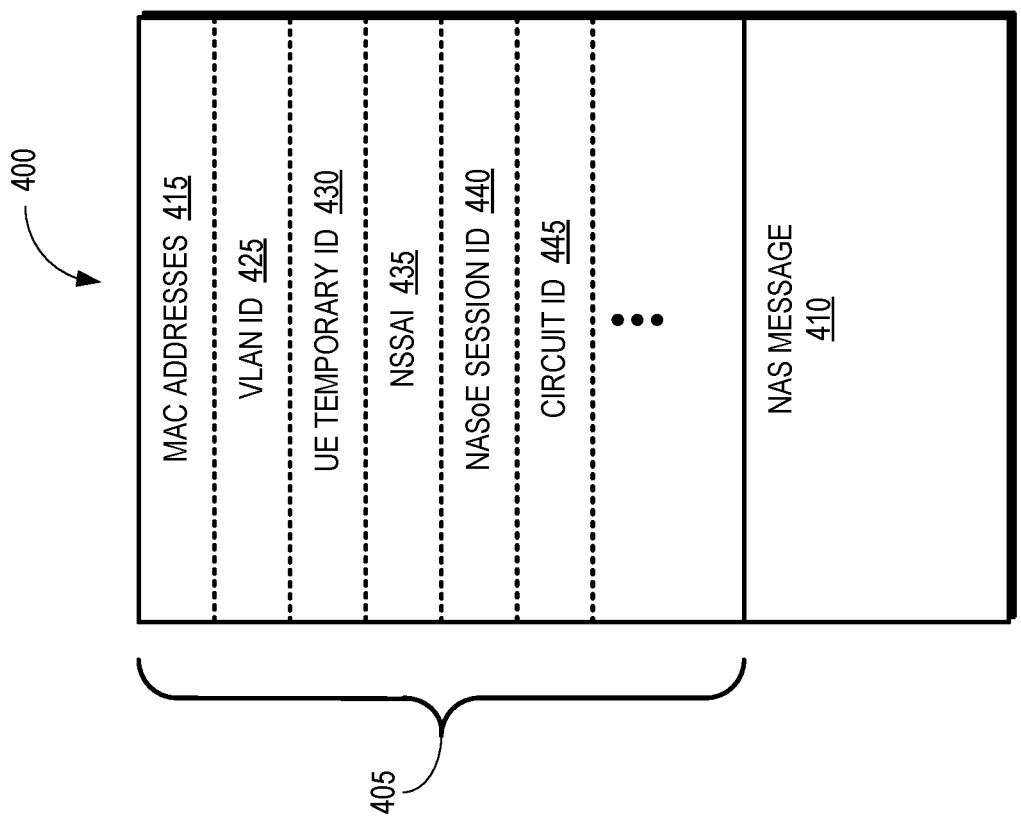
FIG. 4 is a block diagram of an encapsulated NAS message according to some embodiments.

FIG. 4 is a block diagram of an encapsulated NAS message 400 according to some embodiments. The encapsulated NAS message 400 can be conveyed using an NASoE session established in some embodiments of the communication system 100. The encapsulated NAS message 400 includes a header 405 and an NAS message 410, which can include messages such as NAS registration requests, PDU session request messages, PDU session request acknowledgments, and the like.

The header 405 is configured according to an NASoE protocol so that the encapsulated NAS message 400 can be conveyed via an NASoE session established between the user equipment and an interworking function.

Some embodiments of the header 405 include user plane addressing information. For example, the interworking function header 405 can include media access control (MAC) addresses 415 or virtual local area network (VLAN) identifier information 425 provided by the interworking function in NASoE to control the user equipment addressing in the uplink direction, as discussed below with regard to FIGS. 5 and 6. The VLAN identifier 425 or the MAC address 415 can be generated by the interworking function and can be used to identify a network slice instance in the access network. This allows dynamic selection of VLANs using control plane mechanisms.

Some embodiments of the header 405 include a temporary identifier 430 of the user equipment or an NSSAI 435 that is used to assist in selection of a network slice for the user equipment. The temporary identifier 430 identifies an AMF group and (if the user equipment has been previously served by the network) an AMF identifier of the AMF that served the user equipment. The interworking function can use the AMF group and AMF identifier to forward the NAS message 410. If the AMF identifier is not available, the interworking function can select an AMF from the AMF group and then forward the NAS message 410 to the selected AMF. The newly selected AMF identifier can be associated with the temporary identifier 430 for subsequent use. The interworking function can also use the NSSAI 435 to select an AMF in other situations such as during the registration phase if the user equipment temporary identifier 430 is not yet available in the header 405. The NSSAI can also be used for selecting an access network slice (or VLAN) by the interworking function. For example, the interworking function can use the NSSAI to identify a VLAN identifier of the network slice.

Some embodiments of the header 405 include an NASoE identifier 440 that identifies the NASoE session that is used to convey the encapsulated NAS message 405. The NASoE identifier 440 can be used to distinguish between multiple NASoE sessions that can be established between the same user equipment (e.g., a residential gateway that provides connectivity to multiple devices) and the interworking function. Some embodiments of the header 405 include a circuit identifier 445 that can be used to provide location information for the user equipment to the core network. The header 405 can also include other access related parameters that are used to indicate the location information. In some embodiments, the location information (e.g. a circuit id) can be inserted by trusted access network nodes (e.g. a DSLAM).

Although the header 405 shown in FIG. 4 includes the information elements 415, 425, 430, 435, 440, some embodiments of the header 405 include different subsets of the information elements 415, 425, 430, 435, 440, which can be included in the header 405 in any combination. Moreover, the header 405 can include additional information elements that are not shown in FIG. 1.

Figure 5:
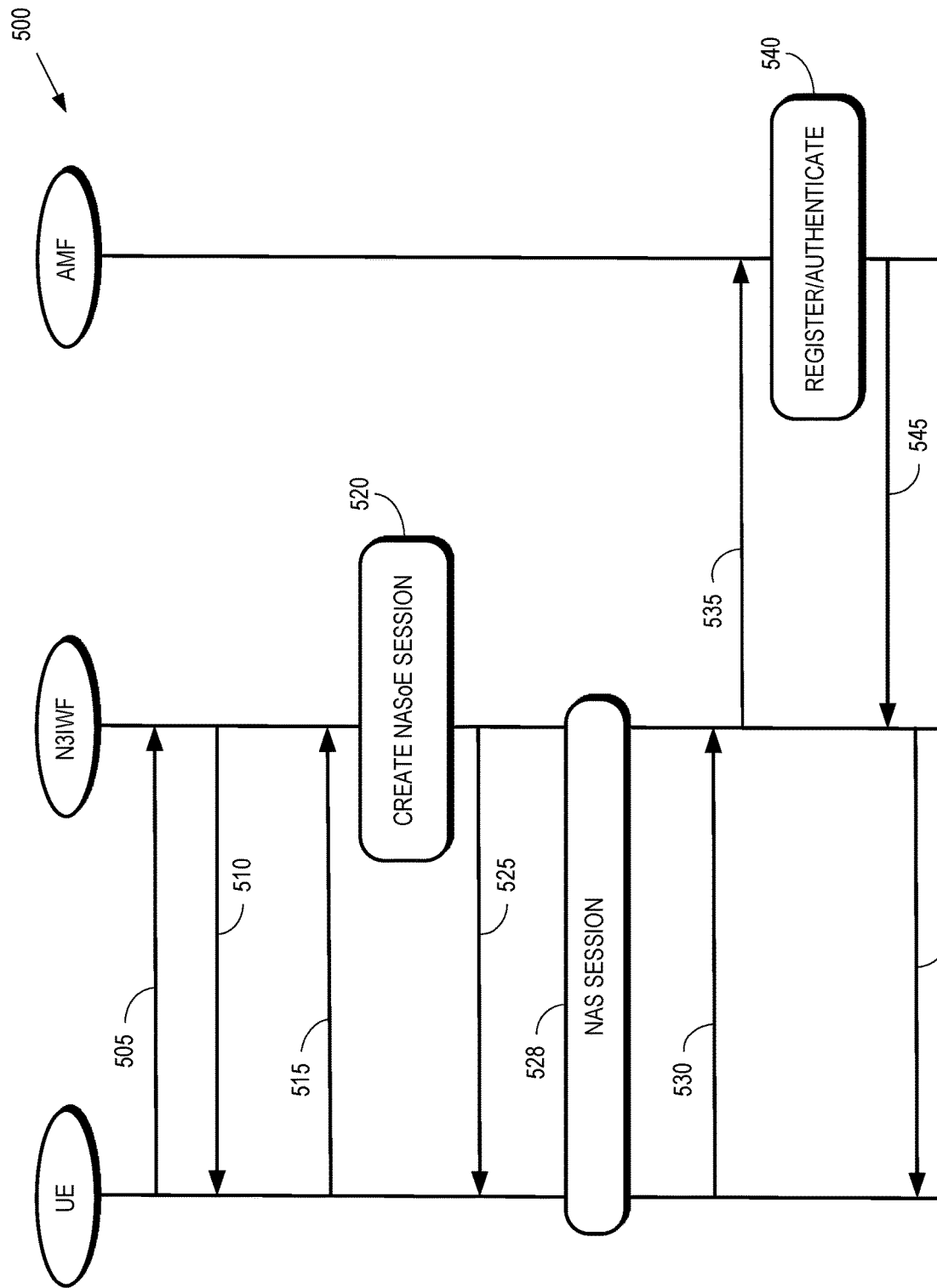
FIG. 5 is a message flow that is used to establish an NASoE session to convey encapsulated NAS messages between a user equipment and an interworking function according to some embodiments.

FIG. 5 is a message flow 500 that is used to establish an NASoE session to convey encapsulated NAS messages between a user equipment and an interworking function according to some embodiments. The message flow 500 illustrates messages exchanged between a user equipment (UE), an interworking function (N3IWF), and an AMF. The message flow 500 is therefore used in some embodiments of the communication system 100 shown in FIG. 1.

The user equipment broadcasts one or more discovery packets 505 towards a possible set of interworking functions. The interworking function shown in FIG. 5 receives the discovery packet and returns a discovery acknowledgment 510. Although not shown in FIG. 5, multiple candidate interworking functions could receive the discovery packets 505 and return corresponding discovery acknowledgments. In that case, the user equipment selects one of the candidate interworking functions as the interworking function that terminates a subsequently formed NASoE session. The user equipment then transmits an NASoE session request 515 to the interworking function in response to receiving the discovery acknowledgment 510. At block 520, the interworking function creates the requested NASoE session 528. For example, the interworking function can create a point-to-point control plane session 528 that is terminated by the user equipment and the interworking function.

The interworking function returns a session acknowledgment 525 to indicate that the requested NASoE session 528 has been created and is available for use in subsequent communication between the user equipment and the interworking function. The interworking function header 405 can include MAC addresses or VLAN identifier information (such as the MAC addresses 415 or the VLAN identifier 425 shown in FIG. 4) in the session acknowledgment 525. The MAC addresses or the VLAN identifier are used to control addressing of messages from the user equipment and the uplink direction. For example, the MAC addresses or the VLAN identifier can be used to tell the user equipment which addressing information to use for NAS transfer over the NASoE session. The user equipment and the interworking function can be identified over the point-to-point control plane session 528 using their respective MAC addresses and in some cases a VLAN identifier that is associated with the NASoE session 528.

In the illustrated embodiment, the NASoE discovery process runs on a default control plane VLAN such as an untagged VLAN or using a VLAN identifier of 0 (or any other default value) that is known to the residential gateway if the residential gateway is functioning as the user equipment. However, a different VLAN identifier can be negotiated for the NASoE session. For example, the user equipment and the interworking function can exchange additional messages (not shown in FIG. 5) to negotiate the VLAN identifier that is used for the NASoE session.

At this point in the process, the user equipment can transmit NAS signaling via the NASoE session. In the illustrated embodiment, the user equipment transmits an NAS registration message 530 to the core network via the interworking function using the NASoE session 528. The interworking function uses information in the NASoE header such as an NSSAI or a temporary identifier of the user equipment (e.g., the UE temporary ID 430 or the NSSAI 435 shown in FIG. 4) to relay the uplink NAS signaling from the user equipment to the appropriate entity in the core network. The interworking function relays the registration message over an interface between the interworking function and the AMF, as indicated by the arrow 535. At block 540, the AMF processes the NAS request from the user equipment, e.g. the registration request. For this purpose, the AMF transmits downlink NAS signaling 545 to the user equipment via the interworking function, which relays the downlink NAS signaling via the NASoE session 528, as indicated by the arrow 550.

Some embodiments of the interworking function are configured to monitor signaling to determine whether the user equipment is reachable. The interworking function can also detect failure in the L2 Ethernet protocol as a transport. For example, if there is NAS signaling between the AMF and the user equipment, then reachability can be monitored by the ability to successfully exchange NAS messages. If there is a failure in the NASoE session, then transmission of the NAS messages will fail. When there is no NAS signaling ongoing, a "keep alive" mechanism can be established between the user equipment and the interworking function and the "keep alive" mechanism can be used to determine reachability of the user equipment. The user equipment can also detect failure in the L2 Ethernet protocol as a transport. For example, the NAS layer in the user equipment can detect the failure of a lower layer, such as the NASoE layer, for transmitting NAS.

Figure 6:
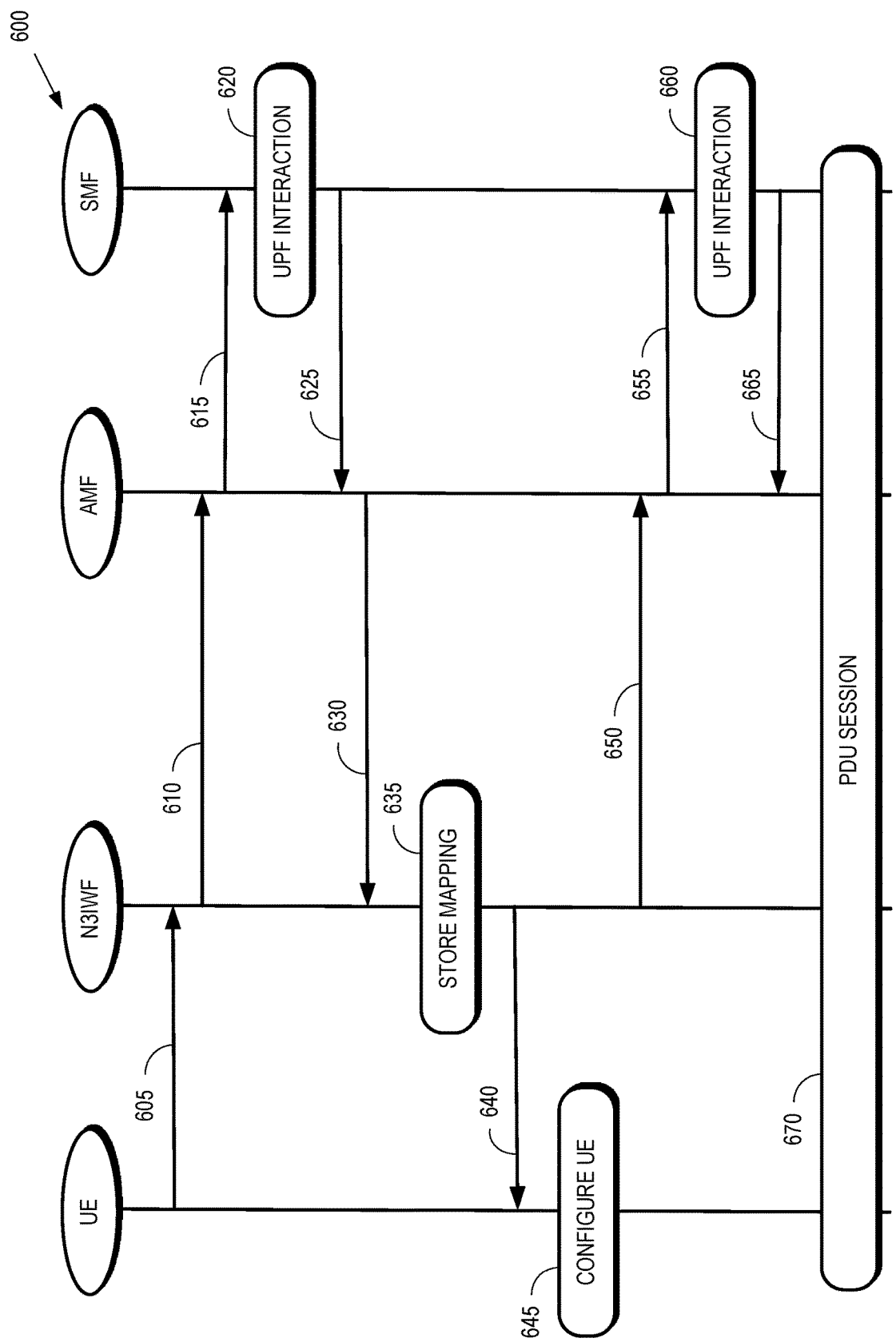
FIG. 6 is a message flow that is used to establish an NASoE session to establish an NAS session between a user equipment and an access and mobility management function (AMF) according to some embodiments.

FIG. 6 is a message flow 600 that is used to establish a PDU session between a user equipment and an SMF/UPF according to some embodiments. The message flow 600 illustrates messages exchanged between a user equipment (UE), an interworking function (N3IWF), an AMF, and an SMF. The message flow 600 is therefore used in some embodiments of the communication system 100 shown in FIG. 1.

The user equipment transmits an NAS PDU session request via the interworking function, as indicated by the arrow 605. The NAS session request is sent via a previously established NASoE session and so the NAS session request is transmitted as a NAS message that is encapsulated using a header that is formed according to the NASoE protocol, as discussed herein.

The interworking function receives the encapsulated NAS message including the NAS PDU session request. The interworking function strips the header from the encapsulated NAS message and forwards the NAS message including the NAS PDU session request based on routing information included in the NASoE header. Some embodiments of the header include routing information such as the information in the header 405 of the encapsulated NAS message 400 shown in FIG. 4. The NAS PDU session request is forwarded to the AMF, as indicated by the arrow 610. For example, the NAS session request can be forwarded as a message that is encapsulated in N2 AP, a protocol used to establish an interface between the interworking function and the AMF and to support PDU sessions by setting up a relevant data plane for the PDU session between the user equipment and a UPF in the core network.

The AMF forwards the request to the SMF, as indicated by the arrow 615. The NAS session request includes a unique PDU session identifier provided by the user equipment. In that case, the AMF can identify the SMF based on the unique PDU session identifier and the AMF forwards the NAS session request to the SMF identified by the PDU session identifier. Additional NAS signaling between the SMF, AMF, and interworking function (not shown in FIG. 6) may be used to establish the PDU session.

At block 620, the SMF interacts with one or more user plane functions and establishes the requested NAS PDU session. The SMF returns a NAS response to the user equipment together with a request to set-up the relevant data plane for the PDU session between the user equipment and a UPF in the core network, both sent via the AMF (at arrow 625). The AMF relays this SMF signaling to the interworking function (at arrow 630). The NAS session response and the user plane set-up request include the PDU session identifier and, in some cases, slicing information such as an S-NSSAI.

At block 635, the interworking function associates the PDU session identifier with user plane addressing information such as an MAC address or a VLAN identifier. The interworking function then stores the mapping between the PDU session identifier and the user plane addressing information for subsequent use. For example, the interworking function can determine the VLAN identifier and MAC address information concurrently with processing the user plane set-up request received from the AMF at arrow 630. The PDU session identifier is associated with the PDU session on an interface between the interworking function and one or more user plane functions. The user plane addressing information is associated with a point-to-point control plane session that is terminated by user equipment and the interworking function, e.g., an NASoE session.

The interworking function provides, as indicated by the arrow 640, information over NASoE that indicates the association between the PDU session identifier and user plane addressing information such as the VLAN identifier or the MAC address assigned to the user equipment for this PDU session. This interaction may also include NAS signaling received from the core network in step 630. At block 645, the user equipment is configured to complete the establishment of the PDU session based on the information included in the message 640 such as an NAS response from the core or user plane addressing information received in NASoE, e.g., the MAC address 415 or the VLAN ID 425 shown in FIG. 4.

The interworking function provides a PDU session request acknowledgment to the AMF, as indicated by the arrow 650. The AMF forwards (at arrow 655) the request acknowledgement to the SMF, which interacts with the UPF to configure the UPF (at block 660) to support the user plane interface with the user equipment. The SMF may provide a response (at arrow 665) to the AMF to indicate that configuration of the UPF to support the user plane interface is complete. At this point, the user plane interface between the user equipment and the UPF is complete and can be used to support communication between the two entities. The PDU session 670 includes a user plane component that is subdivided into a first segment between the user equipment and the interworking function and a second segment between the interworking function and the UPF. The second segment is controlled via the N2 interface between the AMF and the interworking function. The same N2 interface also carries NAS messages between the interworking function and the AMF according to the N2 application protocol (AP). User plane addressing information for the PDU session 670 (e.g., MAC addresses or VLAN identifiers) can be used to link the user equipment to the interworking function (and vice versa) or to link the user equipment to the UPF (and vice versa).

FIG. 7 is a block diagram of an interworking function (N3IWF) table 700 that stores a mapping between PDU session identifiers and user plane addressing information according to some embodiments. The table 700 is stored in some embodiments of the interworking function 145 shown in FIG. 1 and can be used to map PDU session identifiers (used to identify NAS sessions) to other identifiers associated with the user equipment such as the user plane addressing that is utilized by NASoE sessions, and vice versa. The table 700 includes entries that associate PDU session identifiers (e.g., PDU SESSION 1) with corresponding temporary identifiers of the user equipment (e.g., UE TEMP 1), NASoE session identifiers (e.g., NASoE 1), and user plane addressing information such as the MAC address of the user equipment (e.g., MAC 1) and the VLAN identifier associated with the user equipment for the session (e.g., VLAN 1). As discussed herein, the table 700 is used by the interworking function to route messages. For example, the interworking function can use the table 700 to map a PDU session identifier of a PDU session to a MAC address in a header of an encapsulated NAS message of a NASoE session that is used to carry an NAS message.

Figure 8:
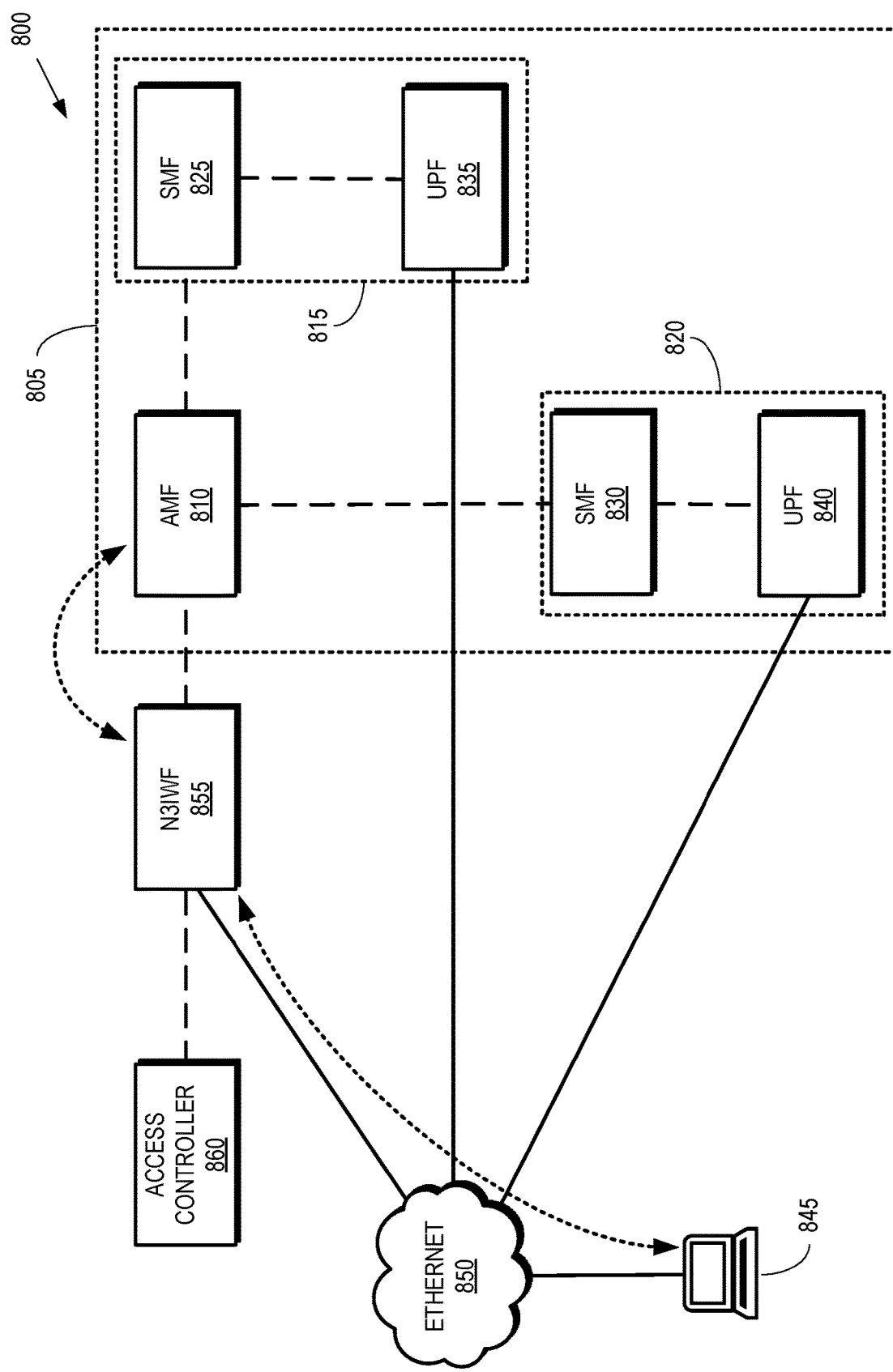
FIG. 8 is a block diagram of a second example of a communication system that supports mobile access and fixed access according to some embodiments.

FIG. 8 is a block diagram of a second example of a communication system 800 that supports mobile access and fixed access according to some embodiments. The communication system 800 includes a core network 805 that is implemented using network function virtualization to support multiple network slices. The communication system 800 can therefore be implemented using some embodiments of the NFV architecture 200 shown in FIG. 2. In the illustrated embodiment, the core network 805 includes an AMF 810 and two network slices 815, 820, which implement corresponding SMFs 825, 830 and UPFs 835, 840. The AMF 810, the SMFs 825, 830 and the UPFs 835, 840 operate in a manner that is similar to the AMF 110, the SMF 115, and the UPF 120 shown in FIG. 1. Although the SMFs 825, 830 are dedicated to the corresponding network slices 815, 820 in the illustrated embodiment, other embodiments of the SMFs 825, 830 can be shared between different slices.

The communication system 800 provides fixed access to a user equipment 855. Although the user equipment 845 is depicted as a device such as a laptop in FIG. 8, the user equipment 845 can also represent other types of devices such as residential gateways, as discussed herein. The user equipment 845 has a fixed access connection to an Ethernet 850, which is connected to an interworking function (N3IWF) 855. In the illustrated embodiment, the interworking function 855 provides control plane interfaces and the Ethernet 850 is directly connected to the UPFs 835, 840 to provide user plane interfaces for the user equipment 845. This configuration removes the interworking function 855 from the user plane path and allows support for multi-edge scenarios with the UPFs 835, 840 dedicated to the corresponding network slices 815, 820. The interworking function 855 terminates point-to-point control plane sessions (e.g., NASoE sessions) with the user equipment 845. The interworking function 855 also terminates a control plane interface towards the AMF 810.

The communication system 800 includes an access controller 860 that is an access network controller or management entity that stores information indicating service VLAN allocations on ports assigned to subscribers or residential gateways. The access controller 860 also stores information representing a mapping of VLAN allocations to network slices as defined by NSSAI for the network slices. An interface between the access controller 860 and the interworking function 855 allows the interworking function 855 to retrieve the VLAN settings (such as a VLAN identifier) associated with an NSSAI for each residential gateway, e.g., based on a circuit identifier of a residential gateway access port, which can be included in a header of an encapsulated NAS message, as discussed herein. Some embodiments of the access controller 860 are implemented as a software defined network controller or management entity.

The message flows 500 and 600 shown in FIG. 5 and FIG. 6, respectively, are implemented in some embodiments of the communication system 800. The message flows 500, 600 can be modified to reflect the absence of the interworking function 855 from the user plane path. For example, the destination address transmitted from the interworking function 855 to the AMF 810 can be the MAC address of the residential gateway. Conversely, the destination MAC address of the UPF associated with the residential gateway is sent by the SMF to the user equipment via the interworking function 855. The interworking function 855 can retrieve the service VLAN to be used by the residential gateway from the access controller 860 using the NSSAI. The retrieved service VLAN can then be communicated to the residential gateway in an encapsulated NAS message transmitted by the interworking function 855.

Figure 9:
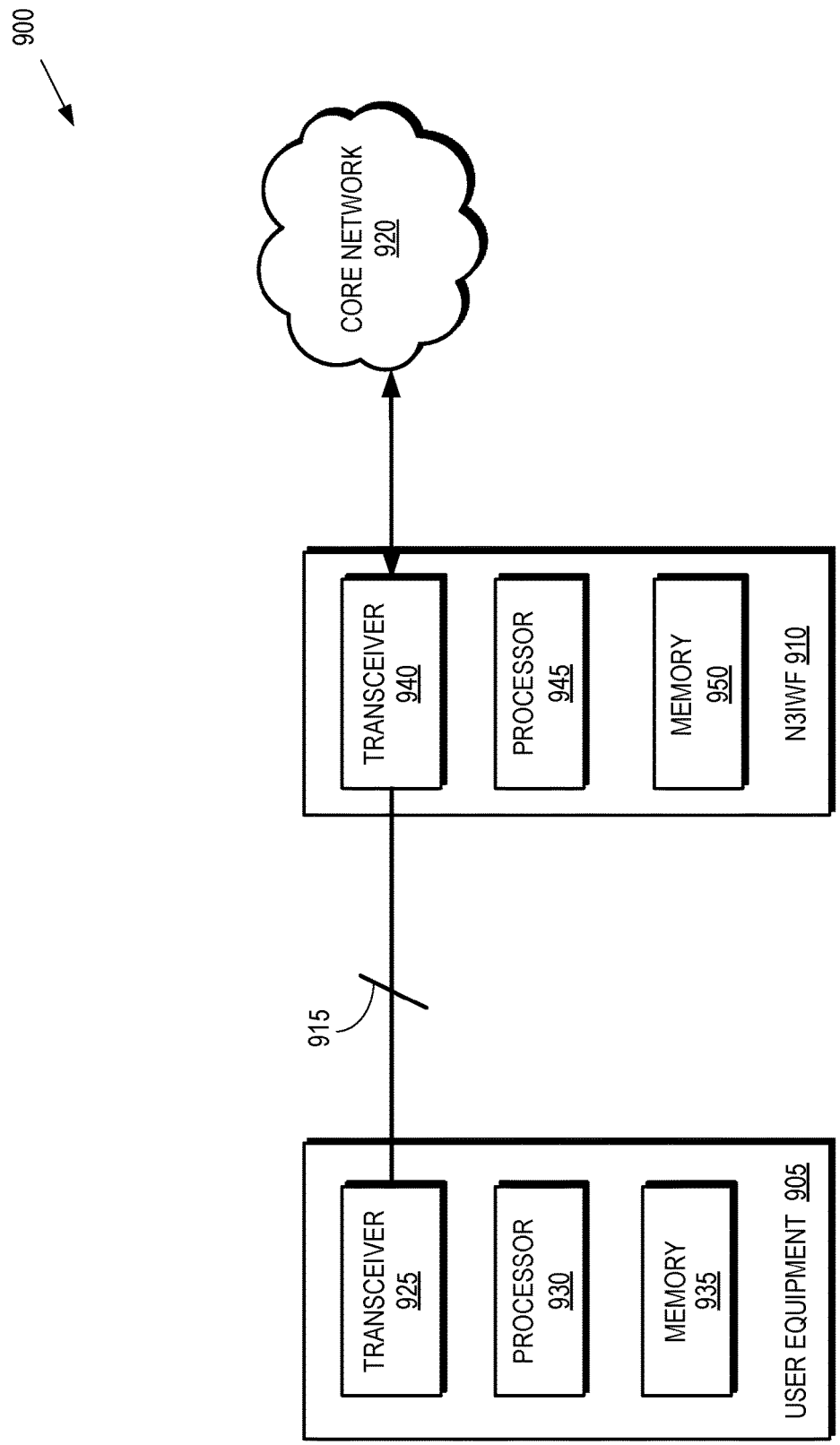
FIG. 9 is a block diagram of a third example of a communication system that supports mobile and fixed access according to some embodiments.

FIG. 9 is a block diagram of a third example of a communication system 900 that supports mobile and fixed access according to some embodiments. The wireless communication system 900 includes a user equipment 905 that is connected to an interworking function 910 by a fixed access interface 915. The interworking function 910 provides connectivity to a core network 920.

The user equipment 905 includes a transceiver 925 for transmitting and receiving signals via the fixed access interface 915. The user equipment 905 also includes a processor 930 and a memory 935. The processor 930 can be used to execute instructions stored in the memory 935 and to store information in the memory 935 such as the results of the executed instructions. The transceiver 925, the processor 930, and the memory 935 can be configured to perform some embodiments of the message flow 500 shown in FIG. 5 and the message flow 600 shown in FIG. 6.

The interworking function 910 includes a transceiver 940 for transmitting and receiving signals via the fixed access interface 915, as well as exchanging signals with the core network 920. The interworking function 910 also includes a processor 945 and a memory 950. The processor 945 can be used to execute instructions stored in the memory 950 and to store information in the memory 950 such as the results of the executed instructions. The transceiver 940, the processor 945, and the memory 950 can be configured to perform some embodiments of the message flow 500 shown in FIG. 5 and the message flow 600 shown in FIG. 6. The transceiver 940, the processor 945, or the memory 950 can be implemented as physical devices or as virtual devices using network functional virtualization. For example, the transceiver 940, the processor 945, or the memory 950 can be implemented using some embodiments of the NFV architecture 200 shown in FIG. 2.

The communication systems 100, 800 and 900 shown in FIGS. 1, 8, and 9, which implement some embodiments of the NASoE protocol disclosed herein, have a number of advantages over conventional communication systems. The NASoE protocol supports reuse of the NAS protocol for fixed access integration with mobile access networks. For example, the same NAS protocol can be supported for fixed or mobile access types so that the same NAS message can be sent over Wi-Fi, 5G, or a fixed access connection between a user equipment and a 5G core network. This enables support for a common 5G core network for all access types. The NASoE protocol also supports retransmission of a single NAS message over multiple access types including mobile access and fixed access, as well as providing support for a common security context across different access types and assignment of temporary identifiers to user equipment at the NAS level. Implementing the NASoE protocol in a layer between the NAS layer and the Ethernet layer in protocol stacks reduces impacts on other 5G network functions because information elements that would normally be carried in an RRC message can be inserted at the NASoE layer, which is below the NAS layer. Furthermore, the NASoE protocol is fully compatible with fixed access deployment practices such as adding circuit identifiers to upstream control messages. The NASoE protocol also supports network slicing in fixed access via dynamic VLAN identifier selection. The NASoE can also be implemented in a manner that is transparent to the fixed access network and only impacts residential gateways and interworking functions.

An optimized architecture such as the architecture of the communication system 800 shown in FIG. 8 provides further advantages over the conventional practice. Removing the interworking function from the user plane path allows user plane functions to be removed from the interworking function. Moreover, since the interworking function in the optimized architecture is only a control plane entity, the interworking function can be virtualized and deployed in the cloud. As discussed herein, the optimized architecture also provides improved support for multi-edge deployments. The optimized architecture also supports automatic retrieval of VLAN identifiers, which can be used for service VLANs on access ports. Automatic retrieval also supports the option of dynamic configuration of the interworking function that avoids manual configuration. The optimized architecture further supports additional options for combining the interworking function with other elements such as an AMF or the access controller.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   appending, at a user equipment, a header to a non-access stratum message to form an encapsulated non-access stratum message, wherein the header is formed according to a wireline access network protocol; and
   transmitting the encapsulated non-access stratum message over a wired connection between the user equipment and an interworking function of a core network,
   wherein transmitting the encapsulated non-access stratum message comprises transmitting the encapsulated non-access stratum message using a point-to-point control plane session.

2. The method of claim 1, further comprising:
   broadcasting a discovery message from the user equipment;
   receiving an acknowledgment of the discovery message from at least one candidate interworking function that includes the interworking function;
   selecting an acknowledgment of the discovery message received from the interworking function; and
   establishing the point-to-point control plane session terminated by the user equipment and the interworking function in response to receiving the acknowledgment.

3. The method of claim 1, wherein appending the header to the non-access stratum (NAS) message comprises appending a header including at least one of a session identifier for a session used to convey the encapsulated NAS message, or information to configure the user equipment to exchange NAS control plane information with the interworking function.

4. The method of claim 3, further comprising receiving the information to configure the user equipment to exchange NAS control plane information with the interworking function, wherein receiving the information comprises receiving at least one of a virtual local area network (VLAN) identifier or a media access control (MAC) address of the interworking function, and wherein the at least one of the VLAN identifier or the MAC address is to be used by the user equipment to exchange NAS messages with the interworking function.

5. The method of claim 1, further comprising:
   adding location information identifying either a physical connection or a location of the user equipment to the encapsulated non-access stratum message.

6. A method comprising:
   receiving, at an interworking function over a wired connection to a user equipment, an encapsulated non-access stratum message including a header and a non-access stratum message, wherein the header is formed according to a wireline access network protocol, wherein receiving the encapsulated non-access stratum message comprises receiving the encapsulated non-access stratum message using a point-to-point control plane session; and forwarding the non-access stratum message to a core network entity selected based on addressing information included in the header.

7. The method of claim 6, further comprising:
receiving a discovery message from the user equipment;
transmitting an acknowledgment of the discovery message; and
establishing the point-to-point control plane session terminated by the user equipment and the interworking function in response to receiving a session request from the user equipment.

8. The method of claim 6, further comprising:
transmitting an indication of at least one of a virtual local area network (VLAN) identifier or a medium access control (MAC) address of the interworking function, wherein the at least one of the VLAN identifier or the MAC address is to be used by the user equipment to exchange non-access stratum messages with the interworking function.

9. The method of claim 6, further comprising:
receiving a request to set up a user plane of a data connectivity service for the user equipment,
determining wireline access addressing information corresponding to the user plane of the data connectivity service; and
providing the wireline access addressing information to the user equipment in a header of a control plane session.

10. The method of claim 6, further comprising:
receiving a request to set up a user plane of a data connectivity service for the user equipment associated with an identifier of the data connectivity service.

11. The method of claim 6, further comprising:
receiving, in the encapsulated non-access stratum message, location information identifying at least one of a physical connection of the user equipment or a location of the user equipment.

12. A user equipment comprising:
a processor configured to append a header to a non-access stratum message to form an encapsulated non-access stratum message, wherein the header is formed according to a wireline access network protocol; and
a transceiver configured to transmit the encapsulated non-access stratum message over a wired connection between the user equipment and an interworking function of a core network,
wherein the transceiver is configured to transmit the encapsulated non-access stratum message using a point-to-point control plane session.

13. The user equipment of claim 12, wherein:
the transceiver is configured to broadcast a discovery message from the user equipment and receive an acknowledgment of the discovery message from at least one candidate interworking function that includes the interworking function; and
the processor is configured to select an acknowledgment of the discovery message received from the interworking function and establish the point-to-point control plane session terminated by the user equipment and the interworking function in response to receiving the acknowledgment.

14. The user equipment of claim 12, wherein the processor is configured to append a header including at least one of a session identifier for a session used to convey the encapsulated non-access stratum (NAS) message, or information to configure the user equipment to exchange NAS control plane information with the interworking function.

15. The user equipment of claim 12, wherein the transceiver is configured to receive at least one of a virtual local area network (VLAN) identifier or a media access control (MAC) address of the interworking function, wherein the at least one of the VLAN identifier or the MAC address is to be used by the user equipment to exchange non-access stratum messages with the interworking function.

16. A device comprising:
a transceiver configured to receive, over a wired connection to a user equipment, an encapsulated non-access stratum message including a header and a non-access stratum message, wherein the header is formed according to a wireline access network protocol, wherein the transceiver is configured to receive the encapsulated non-access stratum message using a point-to-point control plane session; and
a processor configured to access addressing information included in the header, and wherein the transceiver is configured to forward the non-access stratum message to a core network entity selected based on the addressing information.

17. The device of claim 16, wherein:
the transceiver is configured to receive a discovery message from the user equipment and transmit an acknowledgment of the discovery message; and
the processor is configured to establish the point-to-point control plane session terminated by the user equipment and an interworking function in response to receiving a session request from the user equipment.

18. The device of claim 16, wherein the transceiver is configured to transmit an indication of at least one of a virtual local area network (VLAN) identifier or a media access control (MAC) address of an interworking function, wherein the at least one of the VLAN identifier or the MAC address is to be used by the user equipment to exchange non-access stratum messages with the interworking function.

19. The device of claim 16, wherein:
the transceiver is configured to receive a request to set up a user plane of a data connectivity service for the user equipment; and
the processor is configured to determine wireline access addressing information corresponding to the user plane of the data connectivity service and provide the wireline access addressing information to the user equipment in a header of a control plane session.

* * * * *